T. HEGELMAN.
ROLLER BEARING FOR SHAFTS.
APPLICATION FILED MAR. 22, 1918.
1,319,866.
Patented Oct. 28, 1919.
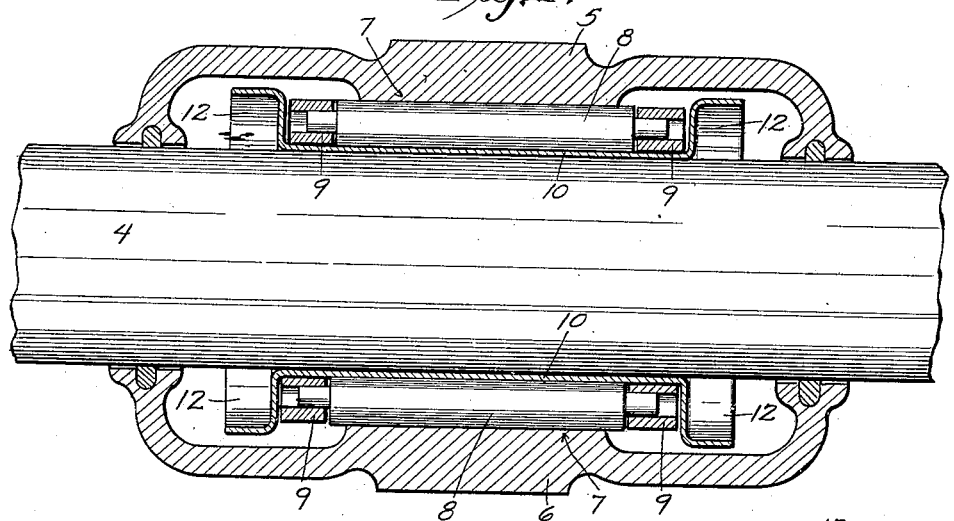
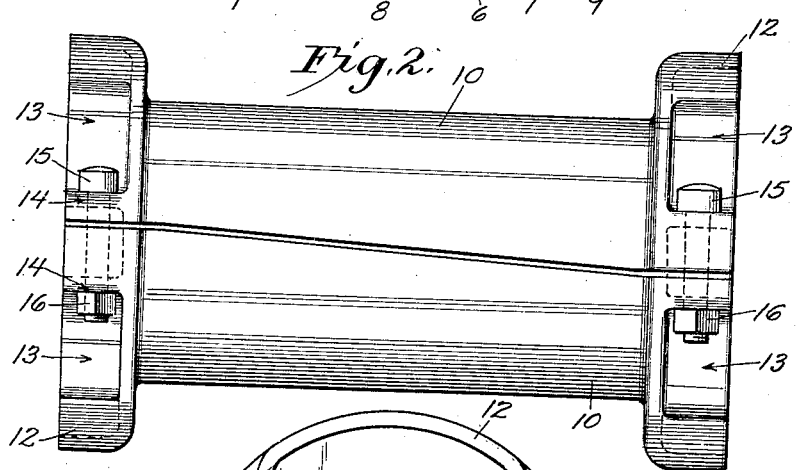
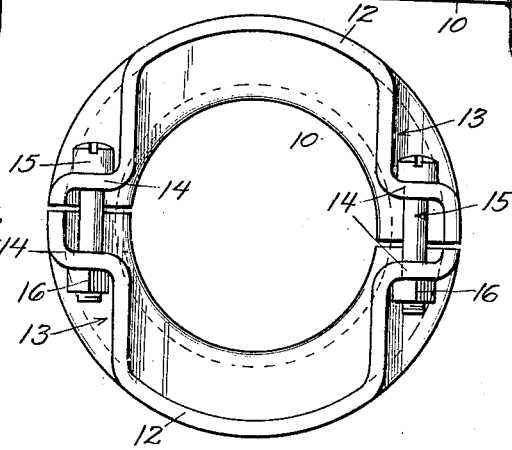
INVENTOR.
Theodore Hegelman
By Frank D. Thomason ATTORNEY

UNITED STATES PATENT OFFICE.

THEODORE HEGELMAN, OF OAK PARK, ILLINOIS.

ROLLER-BEARING FOR SHAFTS.

1,319,866.

Specification of Letters Patent.  Patented Oct. 28, 1919.

Application filed March 22, 1918. Serial No. 223,934.

*To all whom it may concern:*

Be it known that I, THEODORE HEGELMAN, a subject of the German Empire, who has declared his intention to become and has made application for citizenship in the United States, residing at Oak Park, in the county of Cook and State of Illinois, have invented new and useful Improvements in Roller-Bearings for Shafts, of which the following is a full, clear, and exact description.

My invention relates to antifriction roller bearings, and particularly to the roller bearings for shafts constituting the subject-matter of Letters Patent of the United States, granted to T. F. Callahan, February 22, 1910, numbered 950,433.

The greatest objection to the use of bearings of this type results from the frequent breaking of the elements inclosed within the bearing to retain the antifriction rollers in engagement with the races thereof, or the loosening of the same so that they will slide upon the shaft and permit said rollers to become separated from their bearing elements, and together therewith run wild and break and grind and ruin the interior of the bearing and the journaled portion of the shaft. This I accomplish by the means hereinafter fully described, and as particularly set forth in the claims.

In the drawings:

Figure 1 is a longitudinal central section of my improvements applied to a short section of a shaft.

Fig. 2 is a side view of the bushing of the same removed from the bearings.

Fig. 3 is an end view of the same.

Referring to the drawings, 4 represents a section of a revoluble shaft, and 5 and 6 represent the upper and lower members of the two-part bearing therefor, which may be secured together in any suitable manner. This bearing has an internal race 7 mediate its ends, and between this race and the inturned ends thereof, the internal diameter of the shell of the bearings is increased, and the openings out through which the shaft passes in said ends are reduced and provided with suitable packing to prevent dirt and dust entering the interior of the bearing.

A series of antifriction rollers 8 engage and run upon race 7, and the ends of these rollers extend slightly beyond the sides of said race and are reduced in diameter and journaled in suitable bearings in spacer-rings 9, 9, each consisting of two semi-circular parts. The shaft between its ends is surrounded by a longitudinally split bushing 10, the intermediate portion of the body of which forms the race opposed to race 7. The ends 12, 12 of this bushing are enlarged and made cup-shaped, and the circumferential portions of these cup-shaped ends are provided with indentations 13, 13, on each side of the longitudinal edges of the parts of the bushing to provide sunken steps or abutments 14, 14 that are connected by bolts 15, 15, the heads of which are located in one abutment in one part of the bushing and have their screw-threaded ends extend into the opposite indentations in the other part and provided with nuts 16 into which the bolts are screwed so as to thoroughly tighten the two parts of the bushing together and clamp it upon the shaft.

The roller bearing and rings 9, 9, occupy the space between the cup-shaped ends 12 of the bushing, and the cup-shaped ends of the bushing absolutely retain the antifriction rollers and the bearings thereof between them, and even if bolts 15 should become loose and the bushing should move longitudinally the antifriction rollers would not work loose from their bearings, and the major portion thereof would continue to engage race 7 of the bearing and thus prevent the antifriction elements of said bearing from separating and becoming all muddled up inside of the same.

What I claim as new is:—

1. The combination with a revoluble shaft, of a relatively fixed bearing therefor having an internal race between its ends, a longitudinally split bushing having enlarged cup-shaped ends and an intermediate race between said ends; said cup-shaped ends having opposing abutments, fastening means connecting said abutments to hold the bushing together and upon said shaft, and antifriction rollers retained in engagement with said races between the cup-shaped ends of the bushing.

2. The combination with a revoluble shaft, of a relatively fixed bearing therefor having an internal race between its ends, a longitudinally split bushing having enlarged cup-shaped ends and an intermediate race between said ends; said cup-shaped ends having opposing abutments; fastening means connecting said abutments to hold the bushing together and upon said shaft, anti-friction rollers retained in engagement with said races between the cup-shaped ends of the bushing, and spacer-rings between said cup-shaped ends and the race of said bushing in which the ends of said rollers are journaled.

3. The combination with a revoluble shaft, of a relatively fixed bearing therefor having an internal race mediate its ends, a longitudinally split bushing having integral cup shaped enlarged ends and having abutments in the circumferential portions thereof on both sides of the longitudinal edges of the parts of the same, bolts and nuts inserted through said abutments and securing the parts of the bushing together and clamping it to said shaft, anti-friction rollers placed between said cup-shaped ends and spacer rings in which said rollers are journaled and which are located between said cup-shaped ends and the race of the bushing.

In witness whereof I have hereunto set my hand this 5th day of March, 1918.

THEODORE HEGELMAN.

Witnesses:
FRANK D. THOMASON,
FLORENCE MITCHELL.

Copies of this patent may be obtained for five cents each, by addressing the "Commissioner of Patents, Washington, D. C."